(12) United States Patent
Hirose et al.

(10) Patent No.: US 8,522,518 B2
(45) Date of Patent: Sep. 3, 2013

(54) WALK-BEHIND LAWNMOWER HAVING A REAR SHIELD

(75) Inventors: Nobuyuki Hirose, Wako (JP); Hiroshi Hojo, Wako (JP); Shuhei Maruyama, Wako (JP); Fumio Minami, Wako (JP)

(73) Assignee: Honda Motor Co., Ltd., Tokyo (JP)

(\*) Notice: Subject to any disclaimer, the term of this patent is extended or adjusted under 35 U.S.C. 154(b) by 0 days.

(21) Appl. No.: 13/075,862

(22) Filed: Mar. 30, 2011

(65) Prior Publication Data

US 2011/0239615 A1 Oct. 6, 2011

(30) Foreign Application Priority Data

Mar. 30, 2010 (JP) ................................ P2010-078915

(51) Int. Cl.
*A01D 34/00* (2006.01)

(52) U.S. Cl.
USPC .......................................... 56/17.4; 56/320.1

(58) Field of Classification Search
USPC ................ 56/17.4, 320.1, DIG. 24, 202, 255; 428/212; 16/225, DIG. 13; 280/762, 851
See application file for complete search history.

(56) References Cited

U.S. PATENT DOCUMENTS

| | | | | |
|---|---|---|---|---|
| 2,489,059 A | * | 11/1949 | Surgi | 56/192 |
| 2,963,842 A | * | 12/1960 | Estes | 56/320.1 |
| 3,095,215 A | * | 6/1963 | Black | 280/851 |
| 3,190,061 A | * | 6/1965 | Gilbertson | 56/10.5 |
| 3,279,818 A | * | 10/1966 | Jones | 280/851 |
| 3,378,995 A | * | 4/1968 | Welsh | 56/320.1 |
| 3,432,183 A | * | 3/1969 | Groll | 56/17.4 |
| 3,650,543 A | * | 3/1972 | Evans | 280/851 |
| 3,726,544 A | * | 4/1973 | Miller | 280/851 |
| 3,727,386 A | * | 4/1973 | Jespersen et al. | 56/320.1 |
| 3,750,378 A | * | 8/1973 | Thorud et al. | 56/10.5 |
| 3,827,220 A | * | 8/1974 | Seidel | 56/320.2 |
| 3,893,284 A | * | 7/1975 | Thon et al. | 56/202 |
| 3,992,042 A | * | 11/1976 | Helmick et al. | 280/762 |
| 4,030,277 A | | 6/1977 | Christopherson | |
| 4,031,694 A | * | 6/1977 | Gobin | 56/202 |
| 4,134,249 A | * | 1/1979 | Wuerker et al. | 56/255 |
| 4,241,567 A | | 12/1980 | Carolan | |
| 4,282,704 A | * | 8/1981 | Stevens | 56/320.1 |
| 4,665,683 A | * | 5/1987 | Paolucci | 56/16.9 |
| 4,966,378 A | * | 10/1990 | Cook | 280/154 |
| 5,101,617 A | * | 4/1992 | Hare et al. | 56/17.4 |
| 5,181,371 A | | 1/1993 | DeWorth | |
| 5,447,021 A | * | 9/1995 | Plamper et al. | 56/17.4 |

(Continued)

FOREIGN PATENT DOCUMENTS

JP 64-037217 A 2/1989

OTHER PUBLICATIONS

European Search Report dated Jun. 24, 2011, issued in corresponding European Patent Application No. 11160446.8.

*Primary Examiner* — Árpád Fábián-Kovács
(74) *Attorney, Agent, or Firm* — Westerman, Hattori, Daniels & Adrian, LLP

(57) ABSTRACT

The rear shield of a walk-behind lawnmower extends downward from a rear end part of a housing and is in the form of an elastic sheet. The sheet has a thin-walled part formed in a central site in a heightwise direction between an upper end part and a lower end part, the upper end part being attached to the rear end part of the housing. The thin-walled part has a thickness set to be smaller than a thickness of other parts.

2 Claims, 7 Drawing Sheets

(56) References Cited

U.S. PATENT DOCUMENTS

| | | | |
|---|---|---|---|
| 5,638,667 A * | 6/1997 | Ellson et al. | 56/320.1 |
| 5,698,283 A * | 12/1997 | Yamasaki et al. | 428/43 |
| 6,207,092 B1 * | 3/2001 | Kulkaski | 264/173.12 |
| 6,355,335 B1 * | 3/2002 | Kulkaski | 428/212 |
| 6,447,889 B2 * | 9/2002 | Kulkaski | 428/212 |
| 7,066,493 B2 * | 6/2006 | Cicansky | 280/848 |
| 7,469,525 B2 * | 12/2008 | Zeigler et al. | 56/320.1 |
| 2002/0095804 A1 * | 7/2002 | Coplan | 33/484 |

* cited by examiner

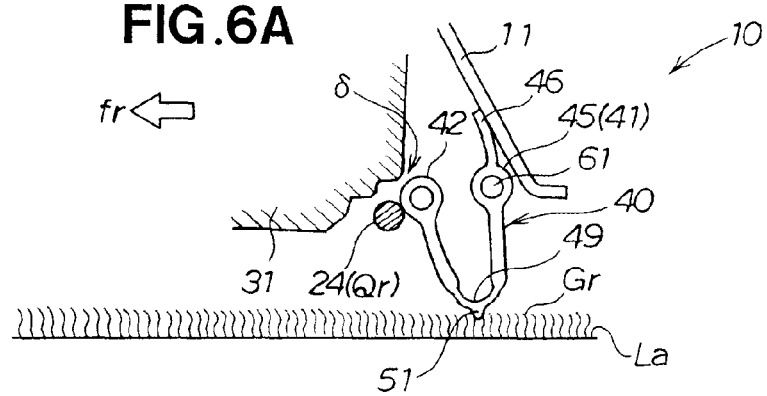
FIG.6A
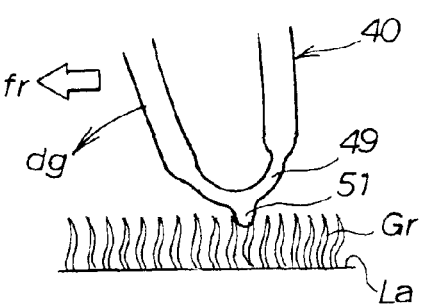
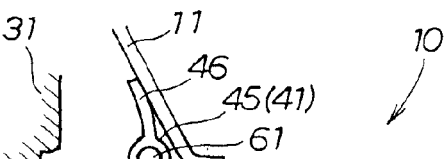
FIG.6B          FIG.6C
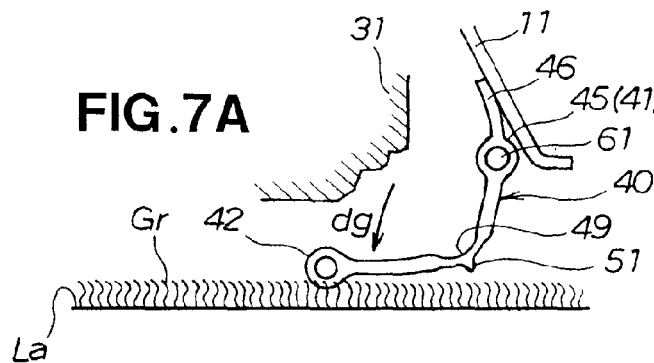
FIG.7A
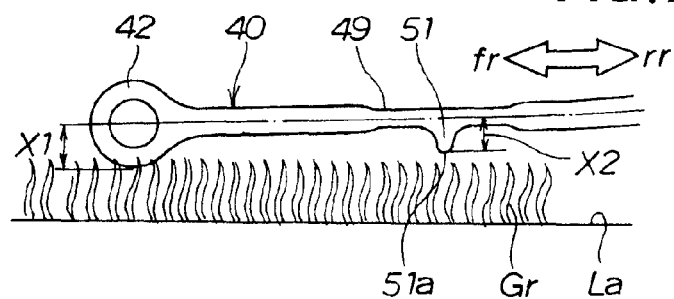
FIG.7B

WALK-BEHIND LAWNMOWER HAVING A REAR SHIELD

FIELD OF THE INVENTION

The present invention relates to a walk-behind lawnmower and, in particular, relates to a walk-behind lawnmower having an improved rear shield provided to a rear part of a housing of the lawnmower.

BACKGROUND OF THE INVENTION

Walk-behind lawnmowers are appropriate for cutting grass in household yards or other narrow areas, and have an operating handle extending to the rear from a housing in which a blade is housed. An example of this type of walk-behind lawnmower is disclosed in Japanese Patent Application Laid-Open Publication No. S64-37217 A.

The walk-behind lawnmower disclosed in JP S64-37217 A has a housing in which the blade is rotatably housed, an operating handle that extends to the rear from the housing, and a rear shield that extends downward from the rear end part of the housing. During mowing operations using the walk-behind lawnmower, various types of debris, e.g., small rocks launched by the blade or the grass cut by the blade, may be projected at the operator from the walk-behind lawnmower. The rear shield is used to prevent such debris from being projected toward the operator.

The rear shield is composed of a single rubber sheet that has a uniform thickness across the entirety of the shield. The lower end part of the rear shield hangs down so as to brush against the ground. When changing the direction of the walk-behind lawnmower, the operator pushes and pulls the operating handle and thereby changes the direction of the walk-behind lawnmower. A force for flipping the rear shield from front to back is applied each time a switch is made between moving forward and moving in reverse. Each time this force is applied the rear shield bends in the front and back direction. Care must therefore be taken so that the rear shield is not caught on axles or other structural components when such bending occurs. The height of the housing above the ground can generally be adjusted in order to adjust the mowing height of the blade. Bending of the rear shield is particularly severe when the height of the housing above the ground is adjusted to a minimum.

In response, increasing the bending rigidity of the rear shield should minimize the bending of the rear shield. However, in such cases the flexibility of the rear shield decreases, and resistance to movement increases when changing the direction of the walk-behind lawnmower, so such an approach is inadvisable. A rear shield having increased bending rigidity is also disadvantageous from the perspective of increasing durability to wear and breakage. Providing a separate minimizing member for minimizing bending of the rear shield involves increasing the number of components, so such an approach is also inadvisable.

SUMMARY OF THE INVENTION

It is an object of the present invention to provide technology for allowing a rear shield of a walk-behind lawnmower to be prevented from becoming caught on other members of the lawnmower.

According to an aspect of the present invention, there is provided a walk-behind lawnmower which comprises: an open-bottomed housing for rotatably housing a blade for cutting grass; an operating handle extending rearwardly from the housing; and a rear shield in the form of an elastic sheet extending downwardly from a rear end part of the housing, wherein the elastic sheet has a thin-walled part formed at a central part in a heightwise direction between an upper end part and a lower end part of the sheet, the upper end part being attached to the rear end part of the housing, and the thin-walled part has a thickness set to be smaller than a thickness of other parts.

In the present invention, the thin-walled part that has little thickness is thus formed at the central part in the heightwise direction of the rear shield that extends downward from the rear end part of the housing. The thin-walled part can therefore be specified as the site at which the rear shield bends when force acts on the rear shield in the front and back direction. A force for flipping the rear shield from front to back is applied each time the walk-behind lawnmower moves forward or in reverse. Each time this force is applied, the thin-walled part bends in the front and back direction of the rear shield.

The bending part of the rear shield is thus limited to the specified site that is set in advance, and therefore the rear shield that is bent in the front and back direction can be restricted from catching on other structural components (the housing, axles, and the like) of the walk-behind lawnmower. The simple configuration requires merely that the thin-walled part be formed at the central site in the heightwise direction of the rear shield. The bending rigidity of the rear shield need not be increased in order to minimize bending of the rear shield.

Preferably, the lower end part of the sheet is formed as a round part having a circular cross-section. The lower end part is therefore not readily caught on the lawn or the grass when the lawnmower is moved forward and backward. Resistance to the movement of the lawnmower can therefore be reduced. The lower end part is also not readily caught up in the housing while the lawnmower is moving.

Desirably, the sheet comprises a protruding part projecting from the thin-walled part toward the operating handle. The lower end part may be lifted up and positioned within the housing (e.g., may be caught on the various members within the housing) when the lower half of the rear shield is bent up from the thin-walled part. The protruding part approaches nearest the lawn and is therefore readily caught on the grass, small stones, or other objects exposed on the lawn. When the lawnmower is moved forward and backward, the protruding part catches on the grass or other exposed objects; i.e., "catching" may occur. "Catching" tends to cause the protruding part to stop when the lawnmower is moving forward and backward. The lower end part that has been lifted up is pushed back by the stopping of the protruding part, and falls to the lawn. In other words, "catching" serves as a chance to knock down the lower end part that has been lifted up. A simple structure involving merely providing the protruding part thus allows the lower end part that is lifted up and positioned within the housing to be readily returned to the ground.

In a preferred form, the round part projects farther toward the operating handle than a distal end of the protruding part. The protruding part is therefore not readily caught on the grass or other exposed objects; i.e., is not readily prone to "catching" when the rear shield is moving in the forward and backward direction in response to the forward and backward motion of the lawnmower. Resistance to the motion of the lawnmower can therefore be minimized.

Preferably, the upper end part of the sheet is formed integrally with a supported part swingably supported on the rear end part of the housing; and the sheet has a rib extending from the supported part in a direction opposite the lower end part of the sheet. The rib therefore swings to the rear and contacts the housing when the rear shield swings forward. As a result, the amount of forward swinging of the rear shield is restricted. When the lawnmower is, e.g., moving in reverse, the rear shield swings forward, whereby the lower half bends up at the thin-walled part, and the lower end part may be thereby lifted up and positioned within the housing. In other words, the rear shield is caught up into the housing. The rib swings backward and contacts the housing in such instances. The amount of forward swinging of the rear shield is restricted. Contact of the lower end part of the bent rear shield with the various members positioned within the housing can therefore be minimized to the greatest possible extent.

BRIEF DESCRIPTION OF THE DRAWINGS

Certain preferred embodiments of the present invention will be described in detail below, by way of example only, with reference to the accompanying drawings, in which:

FIGS. 6A through 6C are schematic views showing the rear shield of FIG. 5C being bent, whereby a lower end part is lifted up;

FIGS. 7A and 7B are schematic views showing the rear shield of FIG. 6A with the lower end fallen to the ground.

DETAILED DESCRIPTION OF THE PREFERRED EMBODIMENTS

Embodiment 1

Figure 1:
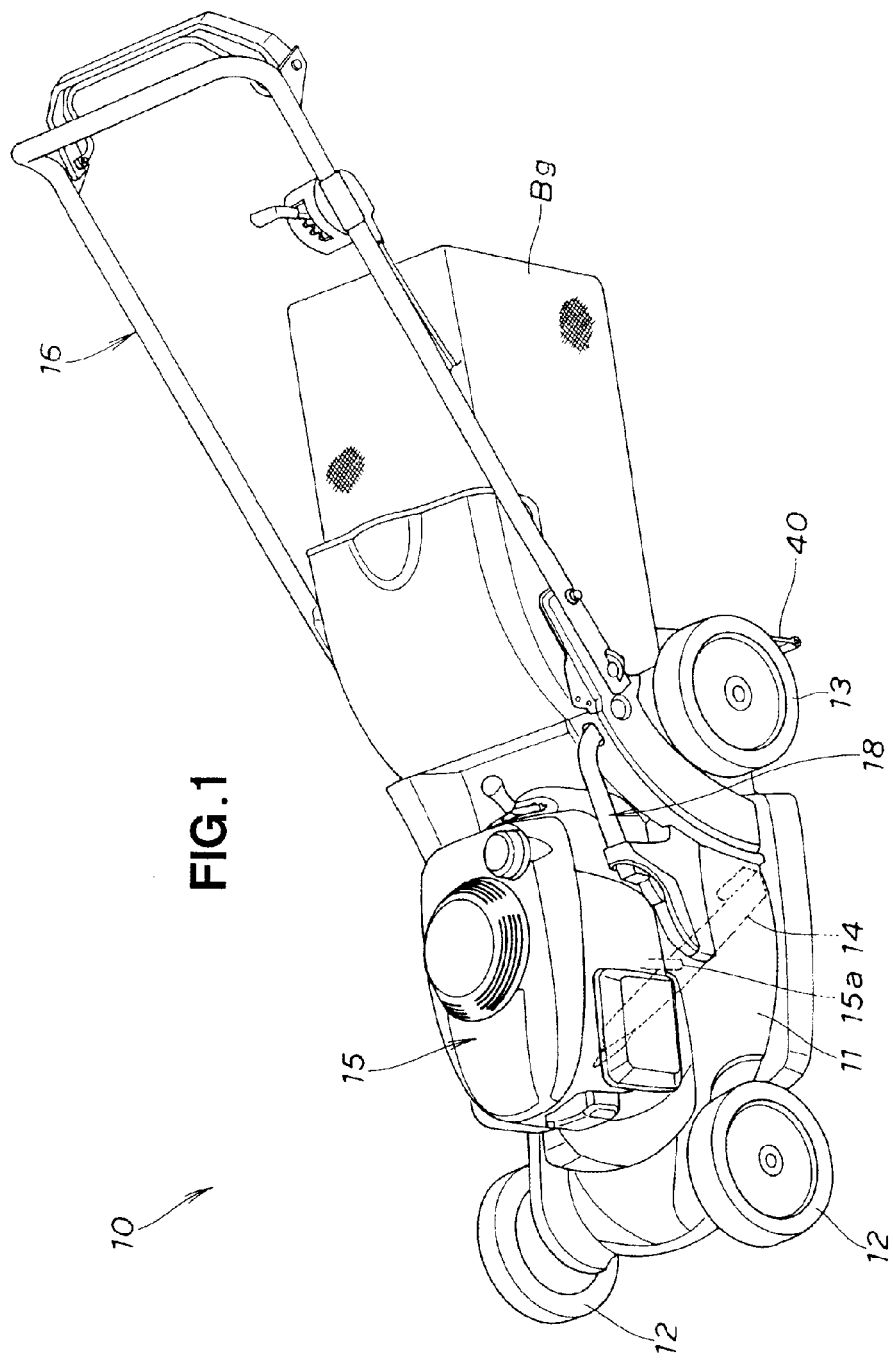
FIG. 1 is a perspective view illustrating a walk-behind lawnmower according to a first embodiment of the present invention.

As shown in FIG. 1, a walk-behind lawnmower 10 is a walk-behind self-propelled work machine for cutting grass, and is composed of a housing 11 that is open at the bottom; left and right front wheels 12, 12 that are provided to the front part of the housing 11; left and right rear wheels 13, 13 that are provided to the rear part of the housing 11; a mowing blade 14 housed in the central interior part of the housing 11; an engine 15 provided to the upper part of the housing 11; an operating handle 16 extending to the rear from the rear part of the housing 11; and a height-adjusting grip 18 provided to the upper-left part of the housing 11.

The housing 11 is composed of, e.g., a resin-molded article and also serves as a chassis. The engine 15 is laid over and bolted to the upper surface of the housing and thereby integrally assembled therewith. The engine 15 is a so-called vertical engine that has an output shaft 15a extending from a lower end of the engine into the housing 11 toward a lawn (ground) La (see FIG. 3) below. The output shaft 15a is a driving shaft that is substantially perpendicular with respect to the lawn (ground) La.

The blade 14 is attached to the output shaft 15a within the housing 11. The blade 14 is driven by the engine 15 and thereby rotates about the output shaft 15a within the housing 11.

In the walk-behind lawnmower (referred to below simply as "lawnmower") 10, the engine 15 causes the blade 14 to rotate, whereby grass is cut away, and airflow (swirl flow) is produced within the housing 11. The swirl flow causes the grass cut by the blade 14 to be carried into and stored in a cut-grass storage unit Bg.

The operating handle 16 is formed into a substantially inverted U-shape when the lawnmower 10 is viewed from the front. The height-adjusting grip 18 is long and thin in the forward and backward direction and is grasped by the operator when adjusting the height of the housing 11 above the ground. Adjusting the height of the housing 11 above the ground allows the mowing height of the blade 14 to be adjusted.

Figure 2:
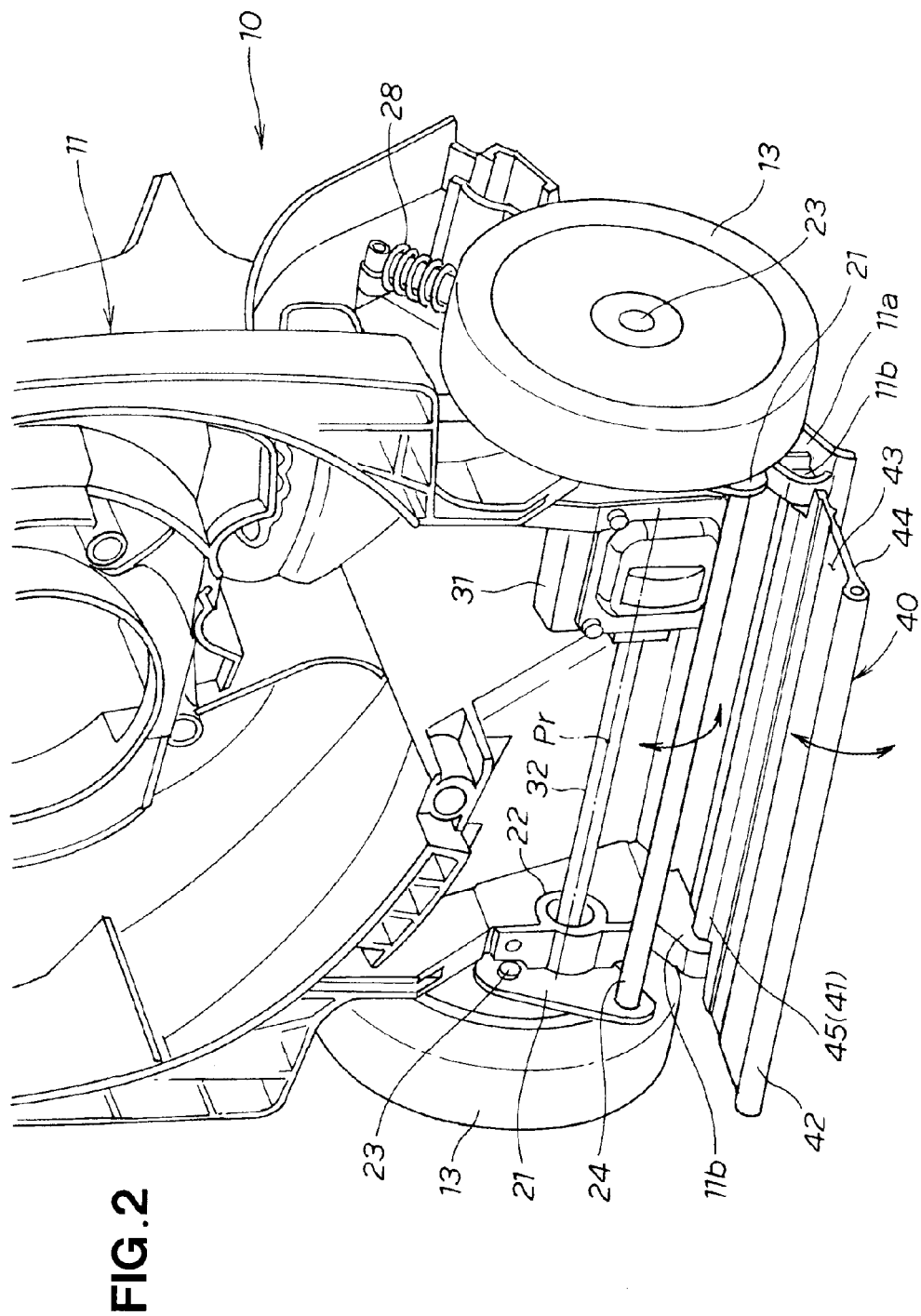
FIG. 2 is a perspective view showing a rear part of the walk-behind lawnmower of FIG. 1, as seen from below.
Figure 3:
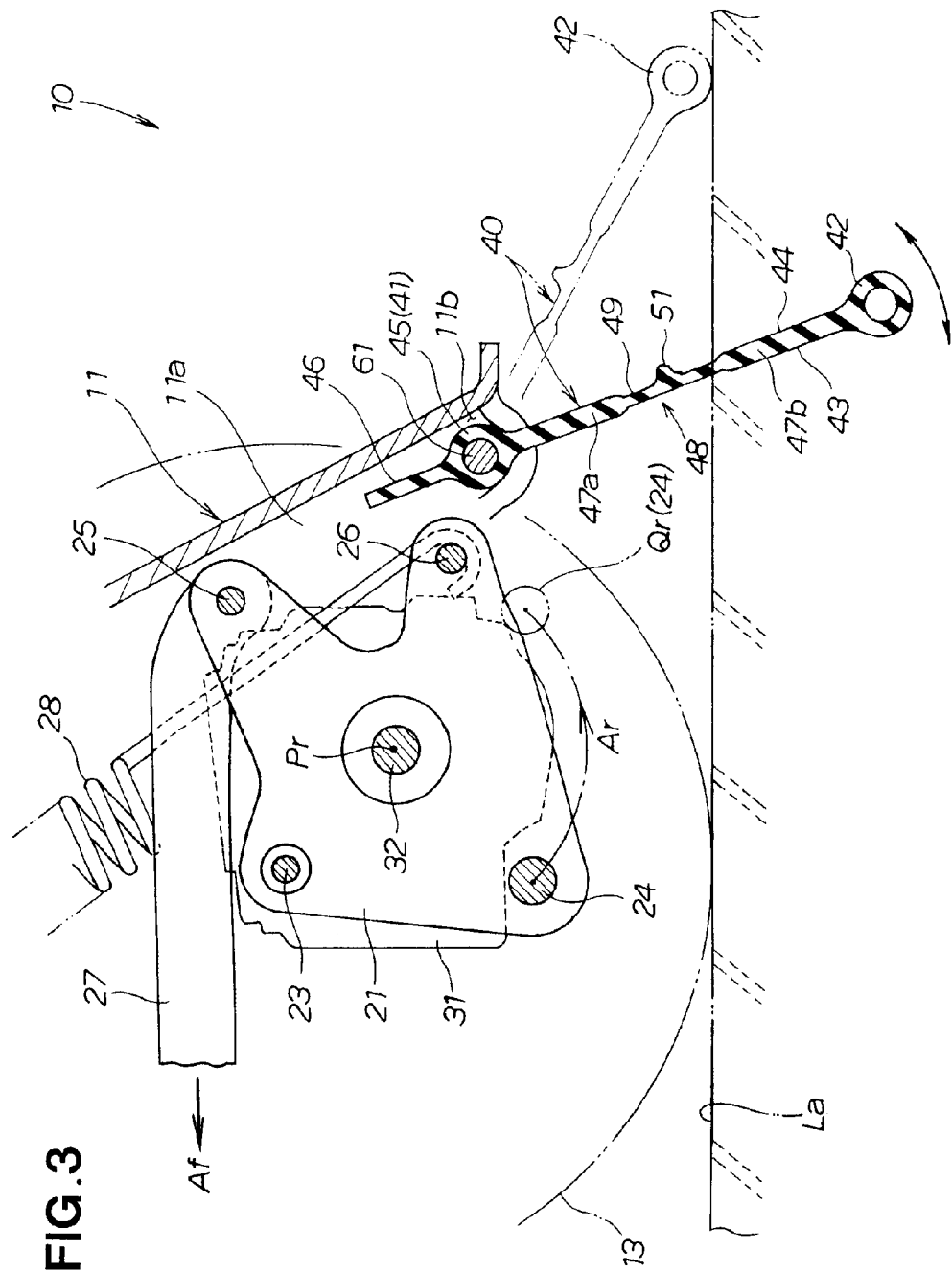
FIG. 3 is a cross-sectional view showing the rear part of the walk-behind lawnmower of FIG. 2, as seen from a side.

The housing 11 is provided with left and right rear-wheel supporting plates 21, 21, a variable speed drive 31, and a transmission shaft 32 on the lower rear part, as shown in FIGS. 2 and 3. More specifically, the housing 11 supports the central part of the left and right rear-wheel supporting plates 21, 21 via respective shaft bearings 22 provided to left and right lateral parts on the rear lower part of the housing 11 so that the supporting plates can rotate in the forward and backward direction. The left and right rear-wheel supporting plates 21, 21 support the rear wheels 13, 13 via axles 23, 23 at sites offset forward and above from a center of rotation Pr of the transmission shaft 32.

The left and right rear-wheel supporting plates 21, 21 are linked together by a linking rod 24 at sites that are offset forward and below from the center of rotation Pr. The left rear-wheel supporting plate 21 has an arm-linking pin 25 at a site offset rearward and above from the center of rotation Pr, and has a spring-peg pin 26 at a site offset rearward and below from the center of rotation Pr. The arm-linking pin 25 rotatably links to the rear end part of a substantially horizontal link arm 27. A spring 28 connected to the spring-peg pin 26 elastically presses (urges) the left rear-wheel supporting plate 21 in a direction for increasing the height of the housing 11 above the ground.

Once an adjustment-locking part (not shown) has been released, the link arm 27 is displaced forward (in the direction of the arrow Af in FIG. 3) when the height-adjusting grip 18 (see FIG. 1) is lifted up, whereby the left rear-wheel supporting plate 21 is rotationally displaced in the counterclockwise direction of FIG. 3 (the direction of the arrow Ar) about the axle 23. The linking rod 24 is therefore rotationally displaced in the same direction Ar about the axle 23 to a position Qr shown by imaginary lines. As a result, the right rear-wheel supporting plate 21 is also rotationally displaced along with the left rear-wheel supporting plate 21.

The center of rotation Pr is displaced upward in relation to the axles 23, 23 according to the rotation of the left and right rear wheel supporting plates 21, 21. As a result, the height of the housing 11 above the ground increases. The adjustment-locking part is thereafter locked, whereby the adjusted height of the housing 11 above the ground is maintained. Thereafter once again releasing the adjustment-locking part and then lowering the height-adjusting grip 18 (see FIG. 1) allows the height above the ground to be lowered.

The transmission shaft 32 is linked to the variable speed drive 31 and extends horizontally in the widthwise direction of the mower along the center of rotation Pr. Both ends of the transmission shaft 32 are linked to the rear wheels 13, 13 via gear transmission mechanisms (not shown) inside the left and right rear wheels 13, 13.

The engine 15 is used to drive the rear wheels 13, 13 in forward rotation via the variable speed drive 31, the transmission shaft 32, and the gear transmission mechanisms, whereby the lawnmower 10 is propelled forward automatically, and lawn-mowing operations are continued. When changing the direction of the lawnmower 10, the operator pushes and pulls the operating handle 16, and can thereby move the lawnmower 10 forward or backward.

The lawnmower 10 has a rear shield 40, as shown in FIGS. 1 through 3. The rear shield 40 extends downward from a rear end part 11a of the housing 11, and a lower end part 42 of the rear shield 40 hangs down so as to brush against the lawn La. During mowing operations, various types of debris, e.g., small rocks launched by the blade 14 or the grass cut by the blade 14, may be projected at the operator from the lawnmower 10. The rear shield 40 can be used to prevent such debris from being projected toward the operator in the rear.

The rear shield 40 is composed of a flexible rubber sheet, flexible resin sheet, or other single elastic sheet. The width of the sheet is set to a size that allows the space between left and right lateral walls 11b, 11b of the rear end part 11a of the housing 11 to be covered.

An end part 41 of the rear shield 40 on the side supported by the housing 11 is called the "upper end part 41," and the end part 42 on the opposite side from the end part 41 is called the "lower end part 42." When the rear shield 40 is supported by the housing 11, a surface 43 on the side facing the blade 14 to the front of the rear shield 40 is called the "front sheet surface 43" or the "blade-facing surface 43," and a surface 44 facing toward the operating handle 16 to the rear is called the "rear sheet surface 44" or the "handle-facing surface 44."

The rear shield 40 will be described in detail below with reference to FIGS. 2 through 4. The upper end part 41 of the rear shield (sheet) 40 is attached to the rear end part 11a of the housing 11 via a supporting pin 61 (see FIG. 3) and is thereby supported so as to allow forward and backward swinging about the supporting pin 61. More specifically, the upper end part 41 has an integrally formed supported part 45. The supported part 45 is formed in the shape of a horizontal tube having a through-hole 45a that allows passage of the horizontal supporting pin 61. The supporting pin 61 that is passed into the through-hole 45a is attached to the left and right lateral walls 11b, 11b of the rear end part 11a of the housing 11. The supported part 45 is therefore supported by the rear end part 11a of the housing 11 so as to allow forward and backward swinging.

The rear shield 40 has a vertical plate-shaped rib 46 that extends from the supported part 45 in the opposite direction from the lower end part 42 of the rear shield 40, i.e., in the direction away from the lawn La. The width of the rib 46 is substantially the same as the overall width of the rear shield 40. The length (rib length) from a center 45b of the supported part 45 to an end 46a of the rib 46 is Hr. The thickness of the rib 46 is t3.

The lower end part 42 of the rear shield 40, i.e., the lower end part 42 of the sheet, is the site that can touch down on the lawn La and is formed as a round part having a circular cross-section. The lower end part 42 is appropriately called the "round part 42" below. The round part 42 has a perfectly circular cross-section, has a through-hole 42a that passes through in the widthwise direction of the mower, and is formed in the shape of a horizontal tube.

An area 47 from below the upper end part 41 to above the lower end part 42 in the rear shield 40 has flat-plate (sheet) shape. The area 47 is referred to below as the "flat-plate area 47." A thin-walled part 49 is formed in the flat-plate area 47 at a central site 48 in the heightwise direction. Thin-walled part 49 forms a living hinge. Other parts 47a, 47b of the flat-plate area 47 exclusive of the thin-walled part 49 in the flat-plate area 47 are called the "other parts 47a, 47b." In other words, the other parts 47a, 47b are the portions above and below the thin-walled part 49 in the flat-plate area 47.

The thickness, i.e., sheet thickness, of the other parts 47a, 47b is t1. The sheet thickness t1 is preferably set so as to allow bending of the rear shield 40 to be minimized. The sheet thickness t1 is set to be smaller than the outside diameter of the supported part 45 and the outside diameter of the round part 42; e.g., is set to approximately one third of those outside diameters.

On the other hand, the thin-walled part 49 formed in the central site 48 in the heightwise direction from the upper end part 41 to the lower end part 42 of the rear shield 40 is formed to be thinner than the other parts 47a, 47b. A thickness t2 of the thin-walled part 49 set to be smaller than the thickness t1 of the other parts 47a, 47b; e.g., is set to approximately one half of the sheet thickness t1.

The rear shield 40 also has a protruding part 51 that extends toward the rear of the housing 11 from the rear sheet surface 44, as shown in FIG. 3. More specifically, the protruding part 51 is a horizontal plate-shaped rib that projects from the thin-walled part 49 toward the operating handle 16 (see FIG. 1). The protruding part 51 is at substantially a right angle in relation to the thin-walled part 49. The width of the protruding part 51, i.e., the size in the left and right direction, is substantially the same as the overall width of the rear shield 40.

The aforedescribed round part 42 projects farther toward the operating handle 16 (on the side of the rear sheet surface 44) than a distal end 51a of the protruding part 51. In other words, the diameter of the round part 42 is De, as shown in FIG. 4. The center of the round part 42 passes along a center line CL of the thickness direction of the rear shield 40, and the radius is X1 (X1=De/2). The amount by which the distal end 51a of the protruding part 51 projects from the center line CL is X2. The radius X1 of the round part 42, i.e., the amount of projection X1 of the round part 42, is larger than the amount of projection X2 of the protruding part 51 (X1>X2).

The size of the range of the thin-walled part 49 in the up and down direction, i.e., the size of the range of the thin-walled part in the direction in which the sheet extends from the direction of the upper end part 41 toward the lower end part 42, is Wt. A center 51b of the protruding part 51 positioned at a central part (dead center) of the range of the thin-walled part 49 in the up and down direction. The distance from the center 45b of the supported part 45, which is supported by the supporting pin 61, to the center 51b of the protruding part 51 (the upper-half distance) is Hu. The distance from the center 51b of the protruding part 51 to a lower end surface 42b of the lower end part 42 (the lower-half distance) is Hd.

The operation of the rear shield 40 having the aforedescribed configuration will now be described.

Figure 5A:
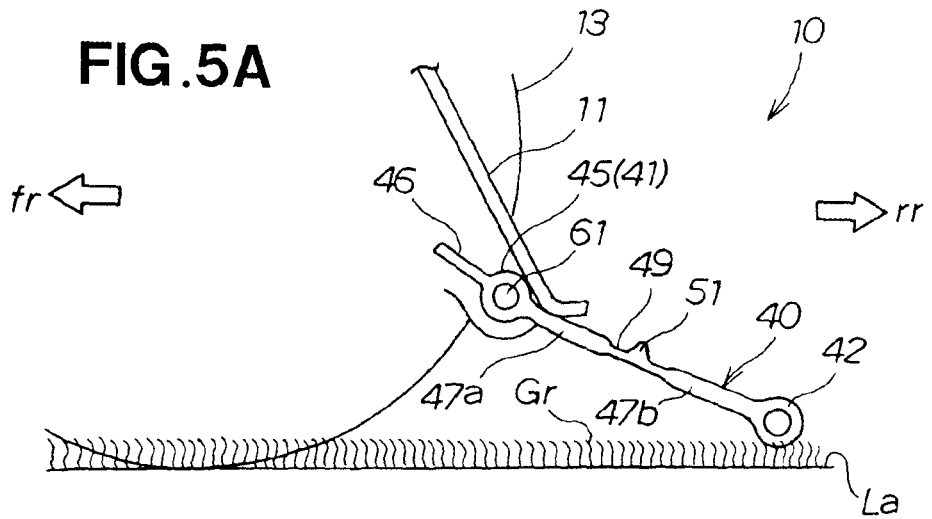
FIGS. 5A through 5C are schematic views showing the rear shield in a state as the walk-behind lawnmower of FIG. 3 is moved in reverse.

FIG. 5A shows a state in which the lawnmower 10 is moving forward (moving in the direction of the arrow fr). The lower end part 42 of the rear shield 40 is dragged along and advances while rubbing against the lawn La or on grass Gr. The lower end part 42 is formed as a round part having a circular cross-section and is therefore not readily caught on the lawn La or the grass Gr. Resistance to the movement of the lawnmower 10 can therefore be reduced. The case is the same when the lawnmower 10 is moving in reverse. The lower end part 42 is also not readily caught up in the housing 11 while the lawnmower 10 is moving.

When the direction of the lawnmower 10 is then changed, the operator pushes and pulls on the operating handle 16 (see FIG. 1), whereby the lawnmower 10 is made to move forward and backward (move in the direction of the arrow rr).

Figure 5B:
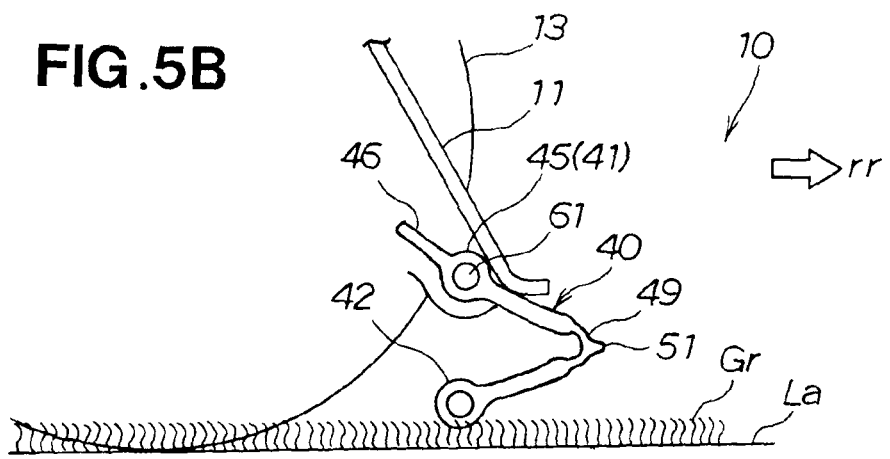

Resistance to the motion of the lower end part 42 relative to the lawn La and the grass Gr results in a bending load that acts on the rear shield 40. The bending load is preferably reduced in order to further mitigate the burden on the operator. The thin-walled part 49 is therefore formed in the middle of the rear shield 40 in the heightwise direction. The thickness of the rear shield 40 is thus not uniform, but the portion 49 (the thin-walled part 49) is set to have a smaller thickness at the predetermined position. The thin-walled part 49 bends more readily in the thickness direction than the other parts 47a, 47b of the rear shield 40, and is a so-called flexible site. The rear shield 40 therefore bends toward the side of the front sheet surface 43 (toward the housing 11) only at the thin-walled part 49, as shown in FIG. 5B. Since the thin-walled part 49 bends readily, resistance to the lawnmower 10 moving in reverse can be reduced.

Figure 5C:
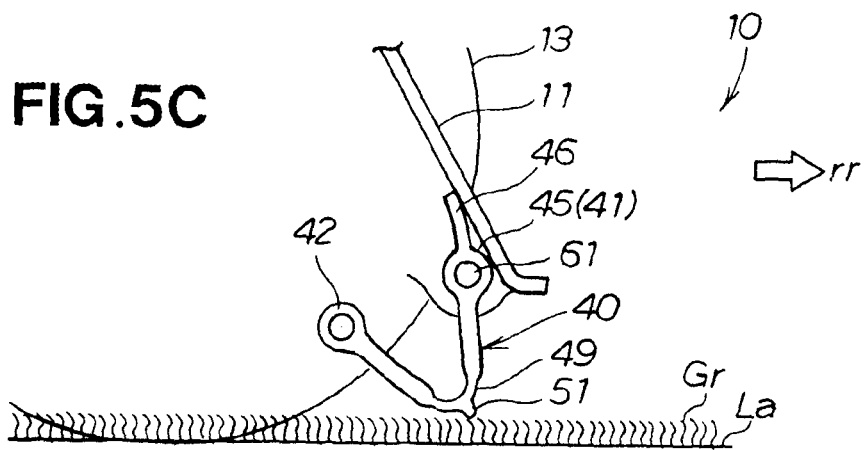

The rear shield 40 is then brought within the housing 11 as the lower half of the rear shield 40 bends at the thin-walled part 49, as shown in FIG. 5C. In other words, the rear shield 40 swings in the clockwise direction in FIG. 5 about the supported part 45. However, the vertical plate-shaped rib 46 is formed at the upper end of the rear shield 40. The rib 46 contacts the inner surface of the housing 11 as the rear shield 40 is caught up into the housing 11. Further swinging of the rear shield 40 in the clockwise direction in FIG. 5 is restricted by the housing 11. The lower end part 42 of the bent rear shield 40 can therefore be prevented to utmost possible extent from contacting other members (the variable speed drive 31 and the like) positioned within the housing 11.

Figure 4:
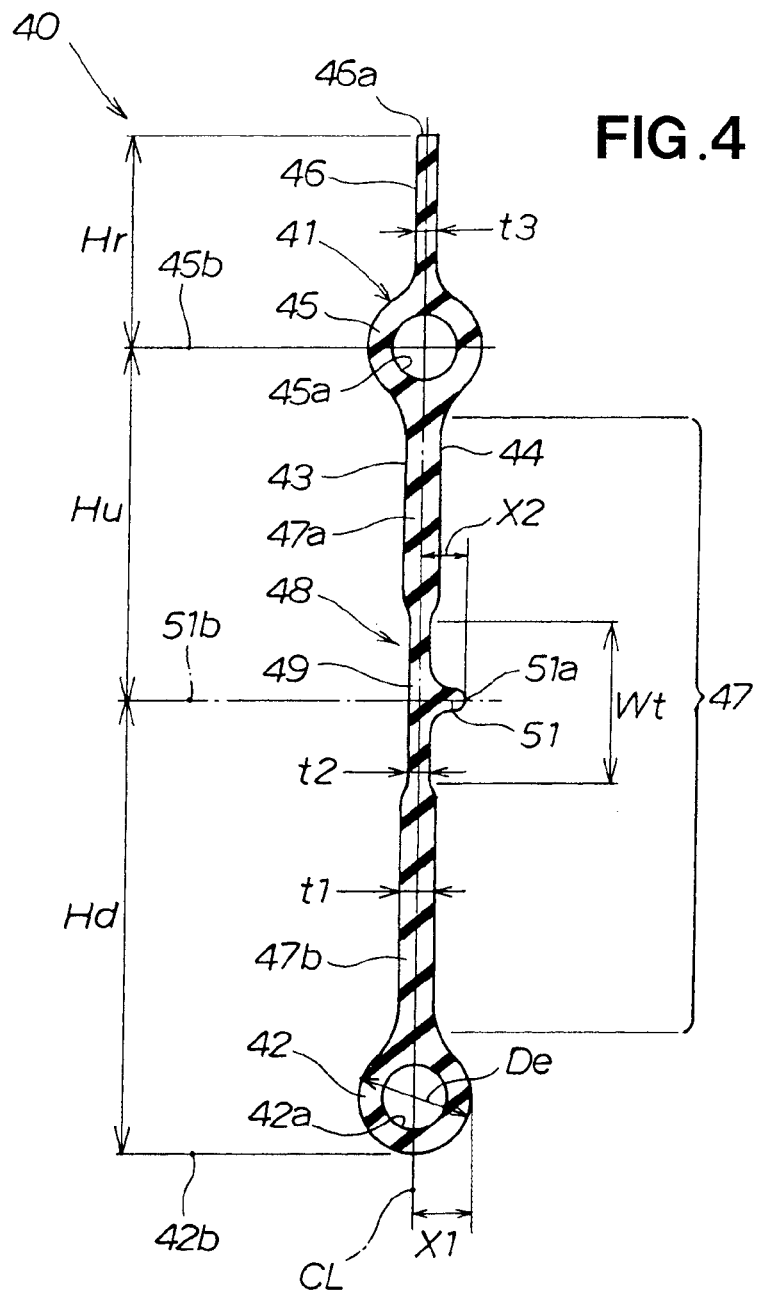
FIG. 4 is an enlarged view showing the rear shield of FIG. 3.

The rib length Hr and the thickness t3 of the rib 46 shown in FIG. 4 are set so that, as shown in FIG. 5C, the lower end part 42 of the bent rear shield 40 can be restricted from contacting the various members positioned within the housing 11 and can return toward the lawn La due to the elasticity of the rear shield 40 itself. The thickness t3 of the rib 46 is preferably set to, e.g., less than the sheet thickness t1.

After the state of FIG. 5C, the bending of the rear shield 40 may cause the lower end part 42 to be lifted up and be positioned in a gap δ between the various members positioned within the housing 11, e.g., in the gap δ between the variable speed drive 31 and the linking rod 24, as shown in FIGS. 6A and 6B. The lower end part 42 is therefore formed into a round part having a circular cross-section. A size Yδ of the gap δ is known during the design stage of the rear shield 40. The diameter De of the lower end part 42 (round part) is therefore set to be larger than the size Yδ of the gap δ. The lower end part 42 is therefore not in danger of entering into the gap δ.

The positions of the thin-walled part 49 and the protruding part 51, and the range Wt of the thin-walled part 49 of the rear shield 40 are set as follows. Specifically, the positions of the thin-walled part 49 and the protruding part 51 and the range Wt of the thin-walled part 49 of the rear shield 40 are set so that the thin-walled part 49 and the protruding part 51 approach nearest the lawn La when the lower end part 42 is positioned at the gap 8 between the various members 24, 31 positioned within the housing 11, as shown in FIG. 6A. The upper-half distance Hu, the lower-half distance Hd, and the range Wt of the thin-walled part 49 shown in FIG. 4 are thus determined.

The protruding part 51 that has approached nearest the lawn La is readily caught on the grass Gr, small stones, or other objects exposed on the lawn La, as shown in FIG. 6C. As shown in FIGS. 6A through 6C, when the lawnmower 10 is moved forward, the protruding part 51 catches on the grass Gr or other exposed objects; i.e., "catching" occurs. "Catching" tends to cause the protruding part 51 to stop when the lawnmower 10 is moving forward. The lower end part 42 that has been lifted up is pushed back forward and down (in the direction of the arrow dg) by the stopping of the protruding part 51, and falls to the lawn La, as shown in FIG. 7A. In other words, "catching" serves as a chance to knock down the lower end part 42 that has been lifted up.

FIG. 7B displays an enlargement of the lower half of the rear shield 40 shown in FIG. 7A. The lower end part 42, which has a circular cross-section, projects further on the side of the rear sheet surface 44 (toward the lawn La) than the distal end 51a of the protruding part 51. The protruding part 51 is therefore not readily caught on the grass Gr or other exposed objects; i.e., is not readily prone to "catching" when the rear shield 40 is moving in the forward and backward direction in response to the forward and backward motion of the lawnmower 10, as shown in FIGS. 7A and 7B. Resistance to the motion of the lawnmower 10 can therefore be minimized.

A summary of the descriptions above will now be given.

In Embodiment 1, the thin-walled part 49 that has little thickness is formed at the central site 48 in the heightwise direction of the rear shield 40 that extends downward from the rear end part 11a of the housing 11, as shown in FIG. 3. The thin-walled part 49 can therefore be specified as the site at which the rear shield 40 bends when force acts on the rear shield 40 in the front and back direction. A force for flipping the rear shield 40 from front to back is applied each time the lawnmower 10 moves forward or in reverse. Each time this force is applied, the thin-walled part 49 bends in the front and back direction of the rear shield 40.

In Embodiment 1, the bending site of the rear shield 40 is thus limited to the specified site (the thin-walled part 49) that is set in advance, and therefore the rear shield 40 that is bent in the front and back direction can be restricted from catching on other structural components (the housing 11, the variable speed drive 31, and the like) of the lawnmower 10. The simple configuration requires merely that the thin-walled part 49 be formed at the central site 48 in the heightwise direction of the rear shield 40. The bending rigidity of the rear shield 40 need not be increased in order to minimize bending of the rear shield 40.

Embodiment 2

Figure 8A:
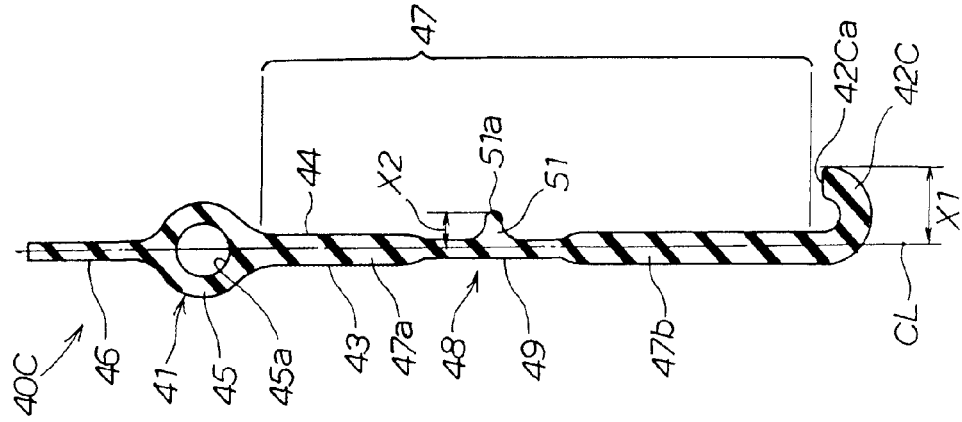
FIGS. 8A through 8C are cross-sectional views showing rear shields according to a second embodiment of the present invention.
Figure 8B:
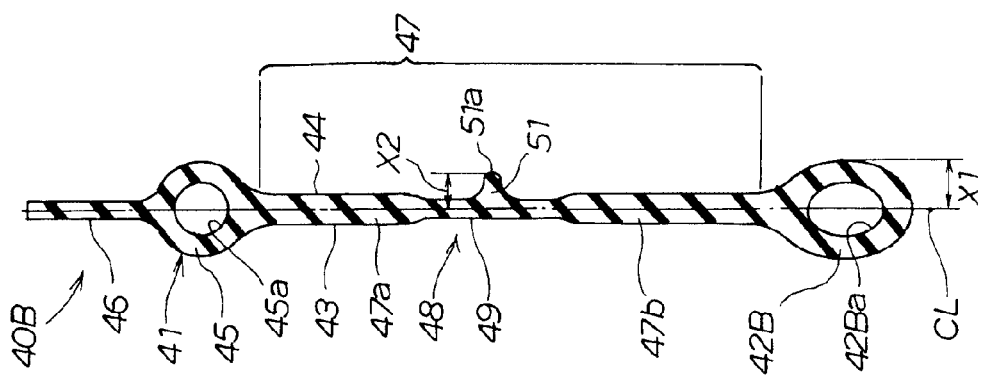
Figure 8C:
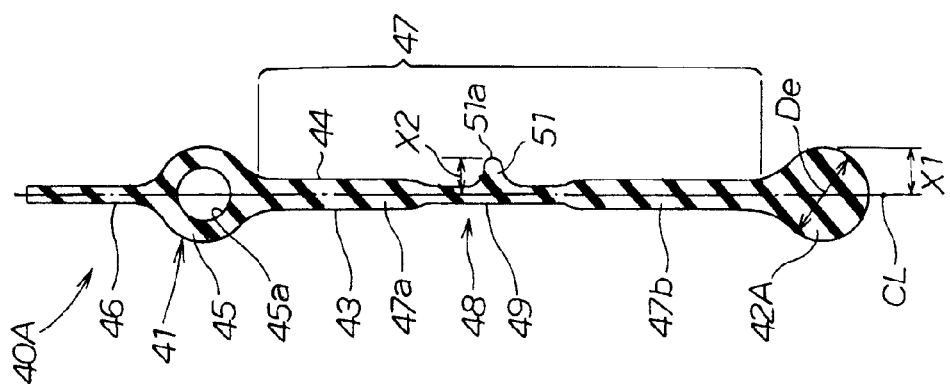

FIGS. 8A through 8C show the cross-sectional structures of rear shields 40A through 40C according to Embodiment 2. Embodiment 2 provides examples in which the lower end part 42 of the rear shield 40 shown in FIG. 4 has been modified. The rest of the configuration and the operation are identical to the configuration and operation of the lawnmower 10 according Embodiment 1 shown in FIGS. 1 through 7, and descriptions thereof will therefore be omitted.

Specifically, a lower end part 42A of the rear shield 40A shown in FIG. 8A does not have a through-hole; i.e., is formed as a round part having a solid circular cross-section. The lower end part 42A (round part 42A) has a perfectly circular cross-section.

A lower end part 42B of the rear shield 40B shown in FIG. 8B is formed as a round part that has an elliptical cross-section that lengthens in the direction toward the upper end part 41 when viewed in cross-section. The lower end part 42B (round part 42B) is formed in a horizontal-tube shape that has a through-hole 42Ba that passes through in the widthwise direction of the lawnmower.

A lower end part 42C of the rear shield 40C shown in FIG. 8C is formed substantially in a J-shape when viewed in cross-section. In other words, the lower end part 42C is bent substantially in a half-circle from the lower end of the flat-plate area 47 toward the rear sheet surface 44, and a bent end 42Ca faces the upper end part 41. The extent of bending from the center line CL is the same as the amount of projection X1 of the lower end part 42 shown in FIG. 4.

The lawnmower 10 of the present invention is not limited to lawnmowers that are self-propelled by the engine 15 or another driving source. Formats in which the operator pushes and pulls to cause the lawnmower to move forward and backward are also possible.

The walk-behind lawnmower of the present invention is ideally applied to rotary lawnmowers.

Obviously, various minor changes and modifications of the present invention are possible in light of the above teaching. It is therefore to be understood that within the scope of the appended claims the invention may be practiced otherwise than as specifically described.

What is claimed is:

1. A walk-behind lawnmower, comprising:
   an open-bottomed housing for rotatably housing a blade for cutting grass;
   an operating handle extending rearwardly from the housing; and
   a rear shield in the form of an elastic sheet extending downwardly from a rear end part of the housing,
   wherein the elastic sheet has an upper end part and a lower end part of the sheet, the upper end part being attached to the rear end part of the housing and the lower end part being adapted to hang down so as to brush against the lawn,
   wherein the elastic sheet has a thin-walled sheet part formed at a central part in a heightwise direction between the upper end part and the lower end part of the sheet,
   wherein the thin-walled sheet part has a thickness set to be smaller than a thickness of other parts,
   wherein the other parts are portions above and below the thin-walled sheet part in a flat-plate area of the elastic sheet,
   wherein the flat-plate area of the elastic sheet is arranged from below the upper end part to above the lower end part in the rear shield, and the thin-walled sheet part is arranged in the flat-plate area, such that the thin-walled sheet part of the flat-plate area is a structure without vertical supporting ribs,
   wherein the sheet comprises a protruding part projecting from the thin-walled sheet part toward the operating handle,
   wherein the lower end part is formed as a round part having a cylinder cross-section below the bottom of the flat plate area,
   wherein the round part projects farther toward the operating handle than a distal end of the protruding part projecting from the thin-walled sheet part, with regard to a center line, as viewed in cross section, of the elastic sheet, and
   wherein the thin-walled sheet part forms a living hinge, to bend backward at the thin-walled part so the lower end part is prevented from contacting at least the variable speed drive.

2. The lawnmower of claim 1, wherein the upper end part of the sheet is formed integrally with a supported part swingably supported on the rear end part of the housing, and the sheet has a vertical plate shape extending upwardly from the supported part, in a direction away from the lower end part of the sheet.

\* \* \* \* \*